(12) United States Patent
Jiang et al.

(10) Patent No.: US 6,833,891 B2
(45) Date of Patent: Dec. 21, 2004

(54) REFLECTIVE LIQUID CRYSTAL DISPLAY USING CHOLESTERIC POLYMERS

(75) Inventors: Yingqiu Jiang, Sunnyvale, CA (US); Aharon Hochbaum, Berkeley, CA (US)

(73) Assignee: Reveo, Inc., Elmsford, NY (US)

( * ) Notice: Subject to any disclaimer, the term of this patent is extended or adjusted under 35 U.S.C. 154(b) by 98 days.

(21) Appl. No.: 09/883,021

(22) Filed: Jun. 15, 2001

(65) Prior Publication Data

US 2001/0055083 A1 Dec. 27, 2001

Related U.S. Application Data

(60) Provisional application No. 60/214,106, filed on Jun. 26, 2000.

(51) Int. Cl.[7] ............................................... G02F 1/335
(52) U.S. Cl. ........................... 349/115; 349/96; 349/98
(58) Field of Search .............................. 349/74, 6, 96, 349/98, 115

(56) References Cited

U.S. PATENT DOCUMENTS

| | | | |
|---|---|---|---|
| 5,221,982 A | * | 6/1993 | Faris ........................... 349/115 |
| 5,325,218 A | * | 6/1994 | Willett et al. ................... 349/74 |
| 5,333,072 A | * | 7/1994 | Willett ........................... 349/6 |
| 5,548,422 A | * | 8/1996 | Conner et al. ................. 349/98 |
| 5,661,533 A | * | 8/1997 | Wu et al. ....................... 349/169 |
| 5,691,789 A | | 11/1997 | Li et al. |
| 5,822,029 A | * | 10/1998 | Davis et al. ................. 349/115 |
| 5,986,730 A | * | 11/1999 | Hansen et al. ................ 349/96 |
| 6,034,753 A | | 3/2000 | Li et al. |

FOREIGN PATENT DOCUMENTS

| | | |
|---|---|---|
| DE | 19708066 | 9/1998 |
| EP | 0600349 | 6/1994 |
| JP | WO 99 34242 | 7/1999 |

OTHER PUBLICATIONS

L. Li, S.M. Faris, *A Singl3–Layer Super Broadband Reflective Polarizer*, SID 96 Digest pp 110–113, (1996).
A. Hochbaum, Y. Jiang, L. Li, S. Vartak, S. Faris, *Cholesteric Color Filters: Optical Characteristics, Light Recycling, and Brightness Enhancement*, SID 99 Digest pp 1063–1065 (1999).
Patent Abstracts of Japan, vol. 1999, No. 11, Sep. 30, 1999 & JP 11 153789 A (Toshiba Corp), Jun. 8, 1999 abstracts.
Patent Abstracts of Japan vol. 1996, No. 01, Jan. 31, 1996 & JP 07 239471 A (Hitachi Ltd). Sep. 12, 1995 abstract.

* cited by examiner

*Primary Examiner*—Thanh Nguyen
(74) *Attorney, Agent, or Firm*—Reveo, Inc.

(57) ABSTRACT

A reflective liquid crystal display (LCD) including a cholesteric liquid crystal polarizing device and a liquid crystal cell superimposed with one another. In various embodiments, the reflective LCD may be a normally white mode or normally black mode device. In another variation, the liquid crystal cell may include a 90° twisted nematic liquid crystal.

22 Claims, 3 Drawing Sheets

REFLECTIVE LIQUID CRYSTAL DISPLAY USING CHOLESTERIC POLYMERS

This application claims the benefit of U.S. Provisional Application Ser. No. 60/214,106, entitled Liquid Crystal Reflective Display Using a Color Filter of Cholesteric Polymers, filed on Jun. 26, 2000.

BACKGROUND OF THE INVENTION (1) Field of the Invention

The present invention generally relates to liquid crystal display devices. This invention more specifically relates to novel technology for reflective liquid crystal displays.

(2) Background Information

The demand for liquid crystal displays (LCDs) has increased substantially in recent years with the proliferation of computer technology. For example, the use of LCDs in personal computers, video cameras, televisions, cellular telephones, watches and a host of other electronic devices is common. The widespread use and acceptance of LCDs has led to increased demands for continued innovation in this technology, to produce, for example, hand held, more energy efficient, and less expensive display devices.

The development of the reflective liquid crystal display is one attempt to meet these demands. A reflective LCD relies on ambient light to display images. Substantially all reflective LCDs, therefore, have a reflector to reflect the incident light back towards the viewer. In a conventional reflective LCD an aluminum mirror has typically been utilized. One difficulty associated with an aluminum mirror is that it is a specular reflector. A specular reflection is generally undesirable because it includes a reflected image of the light source and other objects (including the user), which may distract the viewer from focusing on the displayed image. As a result, practical reflective LCDs typically diffuse the reflected light enough to blur parasitic reflective images, but not so much as to blur the displayed image. In conventional reflective LCDs, diffused reflection is achieved one of two ways; either by a adding a diffuser film, typically at the front of the display stack, or by patterning the inner surface of the glass substrate upon which a metal mirror is deposited. Conventional reflective displays are generally rendered colored by a separate color filter layer that uses light absorption in each pixel to provide, for example, red, green and blue colors. This display structure, wherein a separate component layer is required for each function: color rendering, reflection, and light diffusion, results in a relatively large number of components and tends to result in a more complex production process and higher costs.

Further, the 90° twisted nematic (TN) liquid crystal configuration, which is the dominant technology for transmissive displays, generally cannot be used in conventional reflective LCDs. As a result, other LC configurations tend to be used to achieve adequate brightness modulation at each pixel. Most of these other configurations are generally inferior to the 90° TN in one or more aspects. For example, these LC configurations tend to suffer from a subset of the following deficiencies: an insufficiently dark black state, low brightness, low contrast, individual primary colors having distinct modulation curves, an unbalanced white state (without electric field), relatively high voltage operation, requirement for tight tolerances on cell gap and/or a limited field of view. Any of one or more of these limitations may degrade the LCD performance and/or raise the cost of fabrication. One further potential disadvantage of the non-90° TN configurations is that they are not able to take advantage of the manufacturing infrastructure already in place for transmissive LCDs.

SUMMARY OF THE INVENTION

In one aspect, the present invention includes a reflective liquid crystal display (LCD) including a cholesteric liquid crystal polarizing device, a liquid crystal cell, and an internal quarter-wave retarder. The cholesteric liquid crystal polarizing device, the liquid crystal cell, and the quarter wave retarder are superposed with one another. In variations of this aspect, the reflective LCD may be a normally white mode or normally black mode device. In another variation of this aspect, the liquid crystal cell may include a 90° twisted nematic liquid crystal.

In another aspect, this invention includes a reflective LCD including a linear polarizer, the linear polarizer having a polarization direction, a liquid crystal cell, a quarter-wave retarder, the quarter-wave retarder having a fast axis, a cholesteric liquid crystal polarizing device including a plurality of pixel regions, and an absorbing medium.

In a further aspect, this invention includes a method for fabricating a reflective LCD, the method including providing a liquid crystal cell disposed adjacent to a thin film transistor array having a plurality of pixel regions and superposing the liquid crystal cell with a cholesteric liquid crystal polarizing device.

In still another aspect this invention includes a cholesteric liquid crystal polarizing device. The device includes a substrate, an alignment layer, and a cholesteric liquid crystal polarizing layer including a plurality of pixel regions. The pixel regions are arranged in a repeating array of red pixels, green pixels and blue pixels, the red pixels reflecting circularly polarized red light, the green pixels reflecting circularly polarized green light and the blue pixels reflecting circularly polarized blue light.

DETAILED DESCRIPTION

Figure 1:
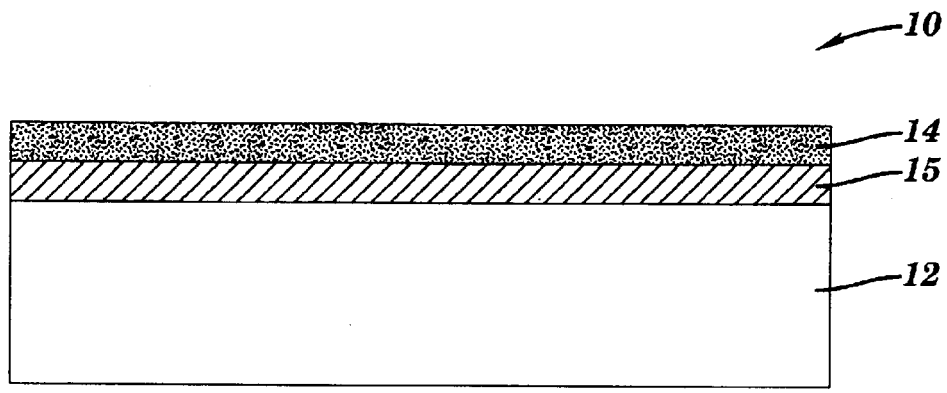
FIG. 1 is a cross-sectioned schematic representation of a pixilated (RGB) CLC polarizing device.

The present invention is a novel reflective liquid crystal display (LCD). The reflective LCD of this invention includes a liquid crystal cell and a cholesteric liquid crystal (CLC) polarizing device. Embodiments of the CLC polarizing device effectively replace the relatively complex assembly of conventional color filter, metal mirror, and diffuser elements. The reflective LCD of this invention tends to have fewer components and may have a simplified production process as compared to such conventional assemblies. Further, this invention may provide for the development of ultra-thin and lightweight reflective LCDs. This invention may further provide for a reflective LCD with high contrast (i.e. a nearly true black state), a balanced white state, high efficiency light modulation, minimal wavelength modulation response, low voltage operation, and tolerance for gap variations.

Prior to discussing the structure and function of this invention, it is helpful to describe CLC polarizing layers. Briefly, CLC polarizing layers may be thought of as being composed of a plurality of thin birefringent films continuously disposed on one another. An important feature of CLC layers in general is their periodic structure: a progression along a preferred direction ("helical axis") is associated with a linear and continuous rotation of the local fast axis of the above birefringent layers. Li et al., (in U.S. Pat. Nos. 5,691,789 and 6,034,753, and SID '96 Digest, p. 111 (1996)) and Hochbaum et al., (in SID99 Digest, p. 1063 (1999)) discuss polymeric CLC polarizing layers and their fabrication in greater detail. The above referenced citations are fully incorporated herein by reference. For the purposes of this disclosure, the following terms and definitions are used throughout. A CLC polarizing layer includes a plurality of cholesteric polymer films that perform a predetermined optical polarizing function, for example reflecting right-hand circularly polarized light (RH) across a spectrum of wavelengths. A CLC polarizing device is a device that performs a predetermined optical polarizing function and includes one or more CLC polarizing layers.

The CLC polarizing device utilized in this invention reflects only one kind of circularly polarized light (RH or LH) in a predetermined range of wavelengths and substantially all other light is transmitted. For example a CLC polarizing device used in this invention may reflect RH light in the red portion of the visible spectrum. LH red light and substantially all light at other wavelengths, whether RH or LH, will be transmitted. The polarizing reflection bandwidth of a CLC polarizing device depends on the molecular pitch distribution profile of the cholesteric liquid crystals and on the birefringence of the CLC material (Li, et al., U.S. Pat. Nos. 5,691,789 and 6,034,753 and Li, et al., SID '96 Digest, p. 111 (1996)). Both the bandwidth and the center wavelength of a CLC polarizing device may be tuned over a wide wavelength range. The bandwidth may extend a few dozen to several thousand nanometers. The central wavelength may be tuned to virtually any wavelength in the visible spectrum. The fabrication of such CLC polarizing devices, which reflect either RH or LH light, is described in the above cited U.S. patents.

Embodiments of the present invention may utilize a CLC polarizing device that includes a plurality of pixel regions. Each pixel region reflects polarized light (RH or LH) in one of the three primary colors (e.g. red, green and blue). A discussion of primary colors may be found in Hecht, Optics $2^{nd}$ Ed., Addison-Wesley Publishing Company, p.115 (1987). Red, green and blue are universally used in LCDs and are therefore used in particular embodiments of this invention. The pixel regions are easily prepared by well-known techniques of controlling the UV light intensity and the exposure time and temperature during curing of UV-curable CLC materials.

Turning now to FIG. 1, an exemplary CLC polarizing device 10 includes a substrate 12 upon which a CLC polarizing layer 14, including a plurality of red, green, and blue pixels, is disposed. An alignment layer 15 is typically interposed between substrate 12 and CLC layer 14 to align the adjacent CLC molecules in layer 14. For example, the alignment layer 15 may be a thin polyimide film that is mechanically 'rubbed' with a nylon pile. The elongated liquid crystal molecules in CLC layer 14 are aligned in the rubbing direction. It is also possible to prepare an alignment layer without mechanical rubbing, for example, using conventional optical radiation properly illuminated on alignment layer 15. These techniques are well known to those skilled in the liquid crystal arts and are therefore not discussed in further detail.

When incorporated into reflective LCDs 20, 20', etc. (discussed hereinbelow), of the present invention, CLC polarizing device 10 may provide similar function to that of a discrete mirror and color filter used in conventional reflective LCDs. Device 10 is different from a conventional mirror, however, in that a given CLC polarizing device reflects only one component of circularly polarized light (RH or LH). The other component is transmitted. Furthermore, a CLC mirror reflects circularly polarized light without changing its circular sense (e.g., incident LH light is reflected as LH light). A conventional mirror, on the other hand, reflects substantially all incident polarizations while reversing their circular sense (e.g., RH light is reflected as LH light and LH light is reflected as RH light).

Figure 2A:
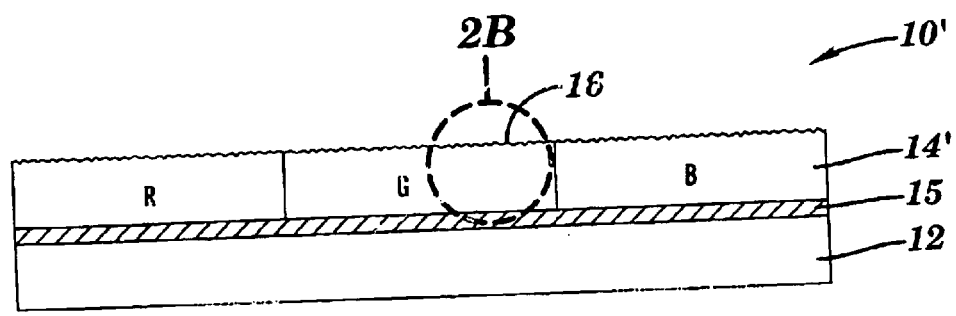
FIG. 2A is a cross-sectioned schematic representation of another embodiment of a pixilated (RGB) CLC polarizing device.
Figure 2B:
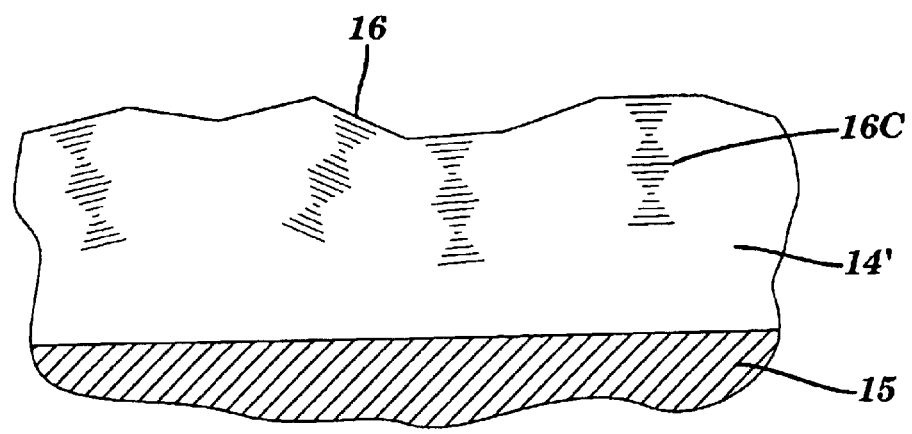
FIG. 2B is an enlarged view of the circular region labeled 2B in FIG. 2A.

Referring now to FIGS. 2A and 2B, alternatively, another embodiment of a CLC polarizing device 10' may be configured to provide the additional functionality of a diffuser element in a conventional reflective LCD. This may be accomplished by employing a CLC polarizing device 10 that includes multiple domains 16, each tilted slightly, and at a random orientation, with respect to one another and to a direction normal to substrate 12. Each domain reflects light at a slightly different angle, as compared to its neighbor domains, resulting in a relatively diffuse reflection from the CLC polarizing device 10'. By controlling the size and relative orientation of the individual domains, one may control the degree of diffuseness in the reflected light. A multiple domain structure may typically be induced by imperfect boundary conditions or material flow during the aforementioned polymerization/UV curing. For example, a multiple domain structure may be achieved by using a clean substrate 12 (i.e., a substrate not including alignment layer 15). In another example, a multiple domain structure may be achieved by texturing substrate 12 in order to align the adjacent CLC molecule in a tilted fashion. A diffuse reflection may also be achieved by embossing an irregular relief structure on the top surface of CLC polarizing layer 14. This may be accomplished by laminating a matte film on the top surface of the CLC polarizing layer 14 prior to UV curing. The film is then removed after UV curing. A suitable matte film material (e.g., stretched polyester) tends to align the adjacent CLC molecules 16C (shown for selected domains in FIG. 2B) parallel to the surface thereof. Since the matte polyester has a relatively rough surface, the local parallel direction varies from point to point leading to a multiple domain structure in the CLC polarizing device 10.

The use of CLC polarizing device 10' may therefore be advantageous in that it may perform the functions of color rendering, light reflection, and light diffusion in a single unitary layer. A CLC polarizing device 10, 10' may provide further advantages relative to the present invention in that it is non-absorptive and is easily pixilated. Yet a further potential advantage of CLC polarizing device 10, 10' is that it may be used in combination with a 90° twisted nematic liquid crystal cell in fabricating a reflective LCD (e.g., LCD 20, 20') as described hereinbelow.

Figure 3:
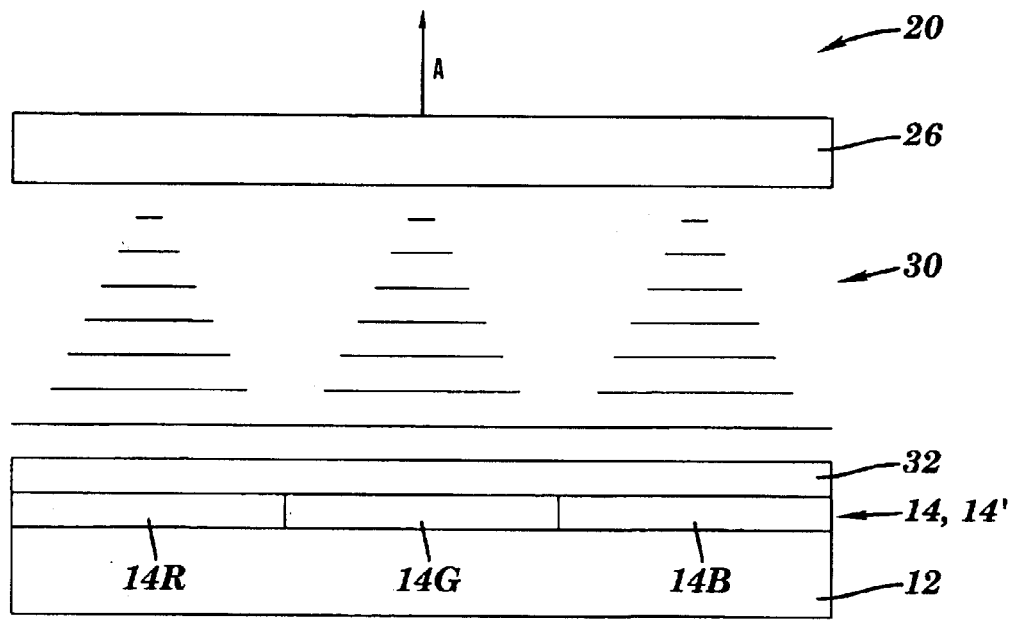
FIG. 3 is a cross-sectioned schematic representation of one embodiment of a reflective LCD of the present invention.

Referring now to FIG. 3, an embodiment of the present invention, shown as reflective LCD 20, typically includes a quarter-wave retarder layer 32 interposed between a voltage actuatable liquid crystal cell 30 (also referred to herein as a liquid crystal layer) and CLC polarizing device 10, 10'. LCD 20 may further include substrates 12 and/or 26. In one desirable embodiment, the quarter wave retarder layer 32 is made of an aligned nematic polymer rather than a stretched (non LC) polymer (e.g., poly vinyl alcohol). This approach allows for a very thin retarder (e.g., about 1 micron), which may be included as an internal retarder inside the LC cell.

Figure 4:
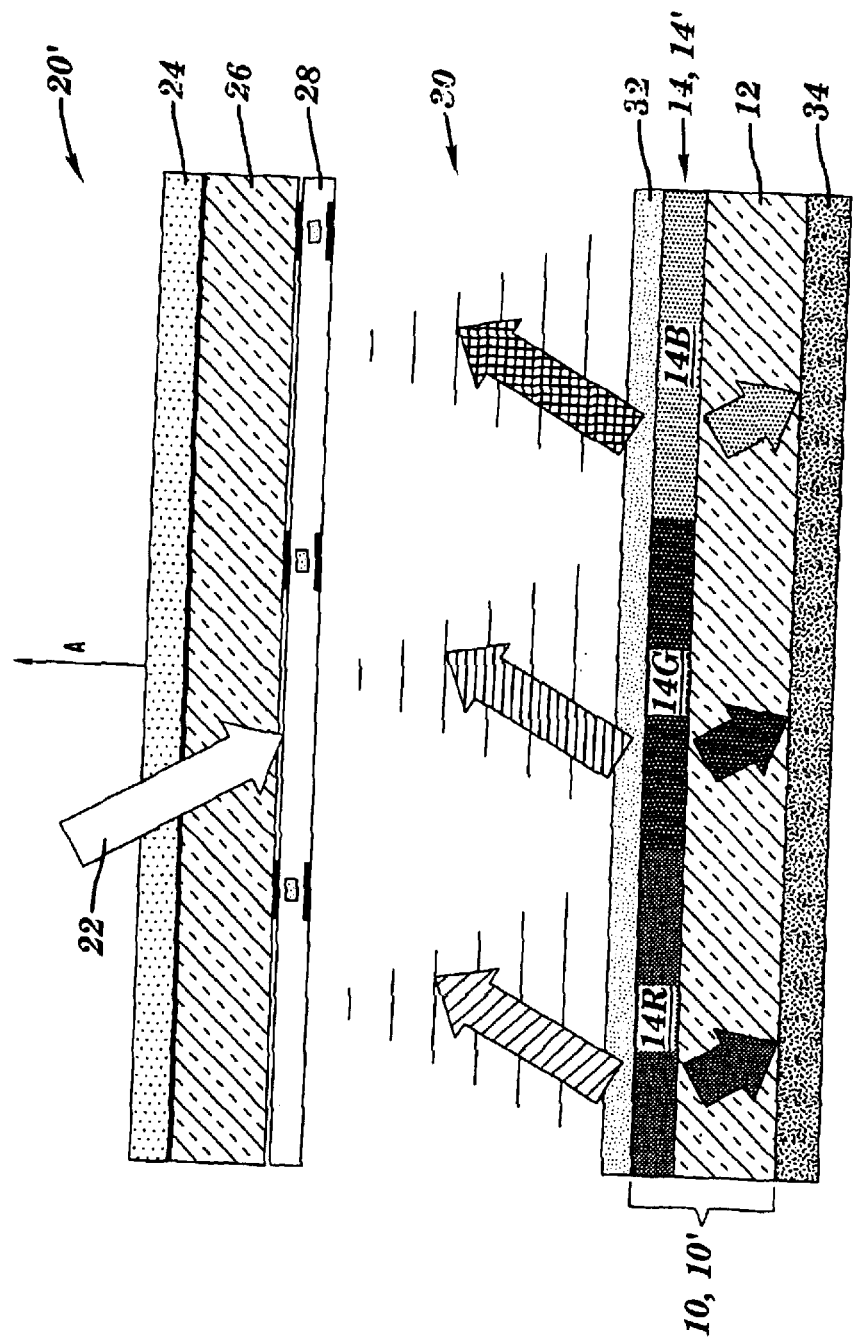
FIG. 4 is cross-sectioned schematic representation of another embodiment of a reflective LCD of the present invention.

Referring now to FIG. 4, a generally desirable embodiment of this invention is shown as reflective LCD 20'. Reflective LCD 20' includes a linear polarizer 24, substrate 26 (e.g., a transparent material such as glass), a layer 28 that includes a pixilated thin film transistor array (TFT) and a black matrix (BM) used to shield the TFT from ambient light and to block reflection from any highly reflecting surfaces in the TFT array, liquid crystal cell 30, quarter-wave retarder 32, a pixilated CLC polarizing device 10, 10' and a black absorber 34, superposed with one another. The TFT is used to electrically address the liquid crystal cell 30 in a conventional manner. (The conventional electrical bus lines connecting to the TFT, and an optional light-shielding layer are not shown explicitly.) During the fabrication process the pixilated CLC device 10, 10' and the pixilated TFT array are aligned using known alignment procedures to achieve a proper axial registration of the pixels therein. As used herein, the term 'axial' or 'axis' corresponds to a direction substantially parallel to axis A of FIGS. 3 & 4. The artisan of ordinary skill will readily recognize that LCD 20' may be configured for passive (rather than active) matrix drive addressing by using a passive TN cell in place of a TFT array.

While not required for the present invention, it is generally desirable that liquid crystal cell 30 includes a 90° twisted nematic (TN) liquid crystal. The advantages of the 90° TN configuration tend to be many, including the ability to produce relatively bright, high contrast images; the red, green, and blue pixels have similar modulation curves; provision of a nearly true black state; provision of a relatively balanced white state; relatively low voltage operation; and a relatively high tolerance to thickness variations that may occur during fabrication thereof. One additional advantage to the 90° TN configuration is that it is the most widely used LC configuration for conventional transmissive LCDs and therefore a substantial infrastructure is currently in place for manufacturing LCDs that include a 90° TN LC (potentially including the reflective LCDs disclosed herein).

A conventional reflective LCD typically operates in one of two modes, referred to as normally white (NW) and normally black (NB). In the NW mode, a reflective LCD is configured to have its highest brightness in the non-energized state, while in the NB mode, a reflective LCD is configured to be dark in the non-energized state. The reflective LCD of the present invention may be configured in either NW or NB mode. The principle of operation of one NW mode and one NB mode embodiment of this invention are discussed hereinbelow. For the purposes of this discussion, all angular orientations are referred to in their conventional sense from the perspective of looking down axis A into LCD 20' (FIGS. 3 and 4), i.e., the angles are taken in a plane transverse to axis A. To further facilitate discussion, the polarization direction of linear polarizer 24 is defined as 0° and the LH CLC polarizing device 10 is configured to reflect LH light and transmit RH light, except as otherwise specifically noted.

In one embodiment, reflective LCD 20' is configured as a NW mode device. LC cell 30 (as described hereinabove a 90° TN configuration is generally desirable) is configured with its generally elongated LC molecules nearest to layer 28 (hereafter referred to as the front LC directors) oriented at 0° and the LC molecules nearest to quarter-wave retarder 32 (hereafter referred to as the back LC director) oriented at 90°. Positive angles are measured in a clockwise direction with respect to the 0° direction. Furthermore, quarter-wave retarder 32 is configured with its fast axis (i.e., the direction of the smallest refractive index) oriented at −45°.

In operation of this NW mode embodiment of LCD 20', linear polarizer 24 acts to linearly polarize (e.g., to 0°, as specified hereinabove) the unpolarized, white light 22 incident thereon. In the non-energized state (i.e., no applied voltage), LC cell 30 rotates the linear polarization direction to 90°. The quarter-wave retarder 32 then converts the white 90° linearly polarized light into white LH light. The red 14R, green 14G and blue 14B pixels of CLC polarizing device 10 reflect red, green and blue LH light, respectively, whereas the remainder of the spectrum, LH cyan, magenta, and yellow, respectively, is transmitted and absorbed by black absorber 34. The reflected red, green and blue LH light is converted back to linearly polarized light with a polarization direction of 90° by quarter-wave retarder 32. LC cell 30 then rotates the polarization direction of the reflected light back to 0°. Linear polarizer 24 then transmits the reflected light and the combination of the red, green and blue pixels is observed as bright white light.

In the energized state, a voltage (greater than or equal to the saturation voltage of the LC material) is applied to a given pixel or pixels in LC cell 30. As is well known in the art, the applied voltage realigns the bulk of the LC molecules parallel to axis A (i.e., to a homeotropic orientation which is optically isotropic for light incident along axis A). As previously described, linear polarizer 24 acts to linearly polarize (e.g., to 0°) the unpolarized, white light 22 incident thereon. In the energized state, LC cell 30 affects no change on the polarization direction of the incident light. The quarter-wave retarder 32 therefore converts the white 0° linearly polarized light into white RH light. CLC polarizing device 10 transmits substantially all RH light to black absorber 34. The resultant output in the energized state may therefore be black.

Grayscale (i.e., modulation of brightness) may be achieved by partially energizing LC cell 30, in a manner similar to that of a conventional reflective LCD. Briefly, in this instance, a voltage, with a value less than the saturation voltage of LC cell 30, is applied. The range of values of applied voltages is determined by the electrodistortional response curve of LC cell 30. The application of this voltage partially aligns the LC molecules with the electric field (e.g., to an angle of 60° at the center of LC cell 30 with respect to axis A). The resultant transmitted light may therefore be thought of as having a mixed polarization state, a portion of which is rotated by LC cell 30 (to an orientation of 90°) and a portion that passes through unaffected (at an orientation of 0°). Quarter-wave retarder 32 therefore converts the light into a mixture of LH and RH light (also referred to as elliptically polarized light). The red 14R, green 14G and blue 14B pixels of CLC polarizing device 10 reflect red, green and blue LH light, respectively, whereas the remainder of the spectrum, LH cyan, magenta, and yellow, respectively as well as substantially all RH light, is transmitted and absorbed by black absorber 34. Increasing the applied voltage at a given pixel or pixels, increases the relative portion of incident light that passes through LC layer unaffected and therefore results in a reduction of light output from that pixel or pixels. By controlling the voltage at each pixel in layer 28 (e.g., by standard active or passive matrix drive addressing) color images with a high degree of contrast may be produced using this embodiment of the reflective LCD 20' of this invention.

The artisan of ordinary skill will readily recognize that a NW mode reflective LCD may also be fabricated with a RH CLC polarizing device that reflects RH light (rather than LH light in the previous example) simply by changing the orientation of the fast axis of quarter-wave retarder 32 from −45° to +45°.

Alternatively, reflective LCD 20' may be configured as a NB mode device. In this configuration, a quarter-wave retarder 32 is configured with its fast axis orientated at +45°. All other components remain substantially identical to that disclosed above for the NW mode. In operation of this NB mode embodiment of LCD 20', linear polarizer 24 acts to linearly polarize (e.g., to 0°) the unpolarized, white light 22 incident thereon. In the non-energized state, LC cell 30 rotates the linear polarization direction to 90°. The quarter-wave retarder 32 then converts the white 90° linearly polarized light into white RH light. LH CLC polarizing device 10 transmits substantially all RH light to black absorber 34, resulting in a black output in the non-energized state.

In the energized state, incident white light 22 is linearly polarized at 0° after passing through linear polarizer 24 and energized LC cell 30 (as described hereinabove). Quarter-wave retarder 32 converts the 0° polarized light to LH light. As described above, red 14R, green 14G and blue 14B pixels of CLC polarizing device 10 reflect the red, green and blue LH light, respectively, and transmit the remainder to the black absorber 34, resulting in the reflection of bright white light. Grayscale (i.e. modulation brightness) for the NB mode configuration is achieved in the same manner as that described above for the NW mode configuration with the exception that increasing the voltage at a given pixel or pixels results in increasing brightness (rather than decreasing brightness) at that pixel or pixels. Furthermore, as also described hereinabove with respect to the NW mode configuration, color images with a high degree of contrast may be produced with the embodiment of reflective LCD 20'.

The artisan of ordinary skill will readily recognize that a NB mode reflective LCD may also be fabricated with a CLC polarizing device that reflects RH polarized light simply by changing the orientation of the fast axis of quarter-wave retarder 32 from +45° to −45°. The artisan of ordinary skill will also readily recognize that the reflective LCDs of this invention may be fabricated with LC cell 30 being configured with the front LC director oriented at 90° and the back LC director orientated at 0° in each of the configurations discussed hereinabove without substantially affecting their function.

The skilled artisan should recognize that although the present invention has been shown and described with respect to color displays/devices, it may also be practiced with monochromatic displays/devices in a manner that would be well understood in light of the teachings hereof, without departing from the spirit and scope of the present invention.

The modifications to the various aspects of the present invention described above are merely exemplary. It is understood that other modifications to the illustrative embodiments will readily occur to persons with ordinary skill in the art. All such modifications and variations are deemed to be within the scope and spirit of the present invention as defined by the accompanying claims.

What we claim is:

1. A reflective liquid crystal display comprising:
   a cholesteric liquid crystal polarizing device including multiple domains, each of said multiple domains skewed at a random angle relative to each other domain;
   a liquid crystal cell; and
   an internal quarter-wave retarder,
   said cholesteric liquid crystal polarizing device, said liquid crystal cell, and said quarter wave retarder being superposed with one another.

2. The reflective liquid crystal display of claim 1 wherein said reflective liquid crystal display includes a normally white mode device.

3. The reflective liquid crystal display of claim 1 wherein said reflective liquid crystal display includes a normally black mode device.

4. The reflective liquid crystal display of claim 1 wherein said liquid crystal cell is disposed adjacent to a thin film transistor array having a plurality of pixel regions.

5. The reflective liquid crystal display of claim 1 wherein said cholesteric liquid crystal polarizing device includes a plurality of pixel regions.

6. The reflective liquid crystal display of claim 5 wherein said pixel regions are arranged in a repeating array of red pixels, green pixels and blue pixels, said red pixels reflecting circularly polarized red light, said green pixels reflecting circularly polarized green light and said blue pixels reflecting circularly polarized blue light.

7. The reflective liquid crystal display of claim 1 wherein:
   said liquid crystal cell is disposed adjacent to a thin film transistor array having a plurality of pixel regions;
   said cholesteric liquid crystal polarizing device includes a plurality of pixel regions; and
   said plurality of pixel regions of said thin film transistor array are in registration with said plurality of pixels of said cholesteric liquid crystal polarizing device.

8. The reflective liquid crystal display of claim 1 wherein said multiple domain structure is produced by disposing a cholesteric liquid crystal polarizing layer on a clean substrate.

9. The reflective liquid crystal display of claim 1 wherein said multiple domain structure is produced by embossing an irregular relief structure on a surface of said cholesteric liquid crystal polarizing device.

10. The reflective liquid crystal display of claim 1, wherein said liquid crystal cell comprises a twisted nematic liquid crystal.

11. The reflective liquid crystal display of claim 10, wherein said twisted nematic liquid crystal is a 90° twisted nematic liquid crystal.

12. The reflective liquid crystal display of claim 1 further comprising a linear polarizer and an absorbing medium.

13. The reflective liquid crystal display of claim 1 comprising a monochromatic display.

14. A reflective liquid crystal display comprising:
   a linear polarizer, said linear polarizer having a polarization direction;
   a liquid crystal cell;
   a quarter-wave retarder, said quarter-wave retarder having a fast axis;
   a cholesteric liquid crystal polarizing device including a plurality of pixel regions, each pixel region having multiple domains, each of said domains skewed at a random angle relative to each other domain; and
   an absorbing medium.

15. The reflective liquid crystal display of claim 14 wherein said liquid crystal cell is disposed adjacent to a thin film transistor array having a plurality of pixel regions.

16. The reflective liquid crystal display of claim 15 wherein said plurality of pixel regions of said thin film transistor array are in registration with said plurality of pixels of said cholesteric liquid crystal polarizing device.

17. The reflective liquid crystal display of claim 14 wherein said liquid crystal cell includes a twisted nematic liquid crystal.

18. The reflective liquid crystal display of claim 17 wherein said twisted nematic liquid crystal is a 90° twisted nematic liquid crystal.

19. The reflective liquid crystal display of claim 14, said reflective liquid crystal display being a normally white mode device, wherein said fast axis of said quarter-wave retarder is oriented at −45° to said polarization direction of said linear polarizer; and said cholesteric liquid crystal polarizing device reflects substantially pure left-hand circularly polarized light.

20. The reflective liquid crystal display of claim said reflective liquid crystal display being a normally black mode device, wherein said fast axis of said quarter-wave retarder is oriented at +45° to said polarization direction of said linear polarizer; and said cholesteric liquid crystal polarizing device reflects substantially pure left-hand circularly polarized light.

21. The reflective liquid crystal display of claim 14, said reflective liquid crystal being a normally white mode device, wherein said fast axis of said quarter-wave retarder is oriented at +45° to said polarization direction of said linear polarizer; and said cholesteric liquid crystal polarizing device reflects substantially pure right-hand circularly polarized light.

22. The reflective liquid crystal display of claim 14, said reflective liquid crystal display being a normally black mode device, wherein said fast axis of said quarter-wave retarder is oriented at −45° to said polarization direction of said linear polarizer; and said cholesteric liquid crystal polarizing device reflects substantially pure right-hand circularly polarized light.

* * * * *